Figure 1:
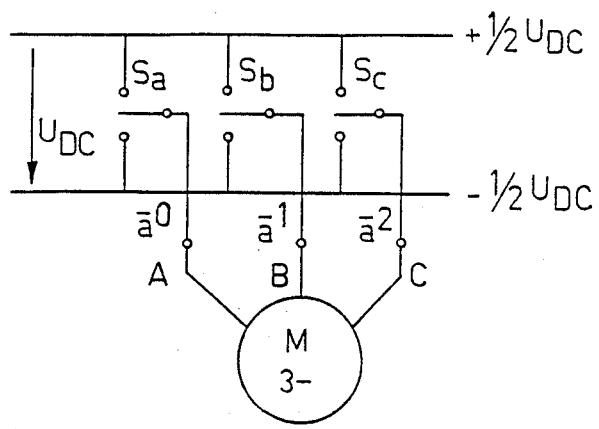

United States Patent [19]

Pohjalainen

[11] Patent Number: 4,918,367
[45] Date of Patent: Apr. 17, 1990

[54] METHOD FOR CONTROLLING THE TORQUE OF AN AC MOTOR

[75] Inventor: Pasi Pohjalainen, Espoo, Finland

[73] Assignee: ABB Stromberg Drives OY, Helsinki, Finland

[21] Appl. No.: 306,167

[22] Filed: Feb. 6, 1989

[30] Foreign Application Priority Data

Feb. 8, 1988 [FI] Finland ................................. 880557

[51] Int. Cl.$^4$ ............................................. H02P 7/00
[52] U.S. Cl. ..................................... 318/801; 318/809
[58] Field of Search ........ 318/786, 729, 732, 771–777, 318/798–805, 806–812; 388/801, 805, 812–815, 819–820, 720–723

[56] References Cited

U.S. PATENT DOCUMENTS

| | | | |
|---|---|---|---|
| 4,078,191 | 3/1978 | Morters et al. | 318/809 |
| 4,280,085 | 7/1981 | Cutler et al. | 318/803 |
| 4,400,655 | 8/1983 | Curtiss et al. | 318/809 |
| 4,453,116 | 6/1984 | Bose | 318/809 |
| 4,511,835 | 4/1985 | Studtmann | 318/723 |
| 4,678,248 | 7/1987 | Depenbrock | 318/805 |

FOREIGN PATENT DOCUMENTS

0179356 10/1985 European Pat. Off. .

OTHER PUBLICATIONS

Takahashi et al; "Quick Torque Control of an Induction Motor by Means of Instantaneous Slip Frequency Control"; Electrical Eng. in Japan; vol. 106, No. 2, 1986.

*Primary Examiner*—William M. Shoop, Jr.
*Assistant Examiner*—David Martin
*Attorney, Agent, or Firm*—Watson, Cole Grindle & Watson

[57] ABSTRACT

The present invention relates to a method for controlling an ac motor supplied by an inverter having several switches. In order that the torque can be adjusted to be as desired as rapidly as possible both with maximum voltage and in the vicinity thereof, one proceeds in accordance with the invention in such a way that a value ($\Delta\gamma$) representing the difference between the reference value and actual value of the angle between the stator flux and rotor flux of the motor is determined on the basis of a value representing the requirement for torque change of the motor, e.g. by means of the difference ($\Delta T$) between the reference valve (T*) and actual valve (T) of the torque, and a quantity representing the magnetic state of the motor, the next switching moment of the switches of the inverter, i.e. the so called limit between flux sectors ($\Delta\phi$), is shifted with a first quantity ($k_1\Delta\gamma$) proportional to the determined differential value to change the angle ($\gamma$) between the stator flux and the rotor flux, i.e. the torque of the motor, in a stepwise manner to be as desired, and that switching moment of the switches of the inverter which is next in turn is shifted with second quantity ($k_2\Delta\gamma$) proportional to the determined differential value and reverse to the first quantity ($k_1\Delta\gamma$) to change the rotating speed of the stator flux.

7 Claims, 5 Drawing Sheets

METHOD FOR CONTROLLING THE TORQUE OF AN AC MOTOR

The present invention relates to a method for controlling an ac motor supplied by an inverter having several switches.

A method of this kind and the basic theory of electrical engineering relating thereto is known e.g. from European published application No. 0 179 356.

In the following, the theoretical background for the invention is explained for clarity by means of an example. The case most frequently found in practice wherein the inverter supplies a three-phase current motor has been taken as an example, even though the corresponding theory as well as the present invention can be applied to ac motor drives of all types. Such a basic circuit of an inverter and a three-phase current motor is shown in FIG. 1. When the ac current motor is supplied by an inverter having several switches as shown in FIG. 1, the motor is controlled by connecting the phase windings A, B, C by means of switch $S_a$, $S_b$, $S_c$ to either the "+" or "−" bar (voltages $+\frac{1}{2} U_{DC}$ and $-\frac{1}{2} U_{DC}$). Thus the switches have two alternative positions which are defined herein as follows:

S=0=>Phase connected to the "−" bar
S=1=>Phase connected to the "+" bar.

In accordance with the general cycle phasor model, the cycle phasor for the inverter voltage is $$u_s(S_a, S_b, S_c) = \frac{2}{3}(u_a + au_b + a^2 u_c) \quad (1)$$
$$= \frac{2}{3} U_{DC} e^{j(n-1)\frac{\pi}{3}} = u_{sn}$$

wherein n=1, 2, . . . 6.

The inverter discussed herein thus provides six possible position vectors for the output voltage in the complex level. Furthermore, if all phases are in the same potential, a zero vector (zero phasor) is provided as the seventh phasor.

The voltage cycle phasor with different switch combinations is as follows when $\frac{2}{3} U_{DC} = 1$.

| $S_A$ | $S_B$ | $S_C$ | $\overline{u_S}$ | | |
|---|---|---|---|---|---|
| 1 | 0 | 0 | 1 | $= 1 \underline{|0°}$ | $= \overline{U_1}$ |
| 1 | 1 | 0 | $1/2 + j\frac{\sqrt{3}}{2}$ | $= 1 \underline{|60°}$ | $= \overline{U_2}$ |
| 0 | 1 | 0 | $-1/2 + j\frac{\sqrt{3}}{2}$ | $= 1 \underline{|120°}$ | $= \overline{U_3}$ |
| 0 | 1 | 1 | $-1$ | $= 1 \underline{|180°}$ | $= \overline{U_4}$ |
| 0 | 0 | 1 | $-1/2 - j\frac{\sqrt{3}}{2}$ | $= 1 \underline{|240°}$ | $= \overline{U_5}$ |
| 1 | 0 | 1 | $1/2 - j\frac{\sqrt{3}}{2}$ | $= 1 \underline{|300°}$ | $= \overline{U_6}$ |
| 1 | 1 | 1 | 0 | $= 0$ | |
| 0 | 0 | 0 | 0 | $= 0$ | |

Table 1. Voltage phasors for inverter

Figure 2:
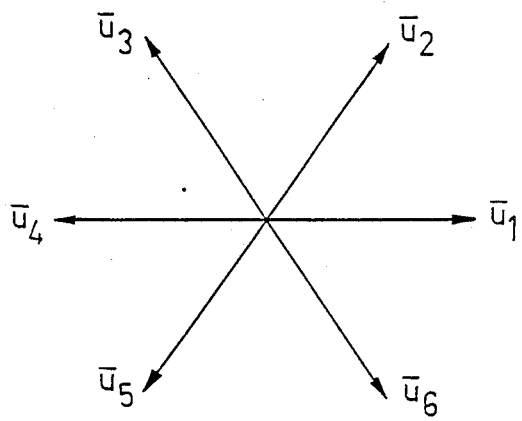

Graphically presented, the voltage phasors $\overline{U}_1$, $\overline{U}_2$, . . . $\overline{U}_6$ form an inverter voltage star as shown in FIG. 2.

This voltage star includes all that can be achieved with a three-phase two-level inverter. The design problem is to solve the external control of switches $S_A$, $S_B$, $S_C$ in the most appropriate way. It is difficult to produce a flux having completely sinusoidal rotation—or at least this requires a high switching frequency—when a three-phase current inverter is used. However, it is possible to produce an approximately circular flux circle by selecting in each case the suitable voltage phasor from the six different alternatives. The suitable voltage phasor is the one maintaining the absolute value of the flux as constant as possible. This phasor simultaneously advances the flux as rapidly as possible. An example of such selection of voltage phasors is FIG. 3 wherein the stator flux is indicated with $\psi_s$ and the voltage phasors with $\overline{U}_1$, $\overline{U}_2$, . . . $\overline{U}_6$.

The suitable voltage phasor is dependent on the angle of the flux in the stator coordinates, the absolute value of the flux and the desired rotating direction.

Figure 4:
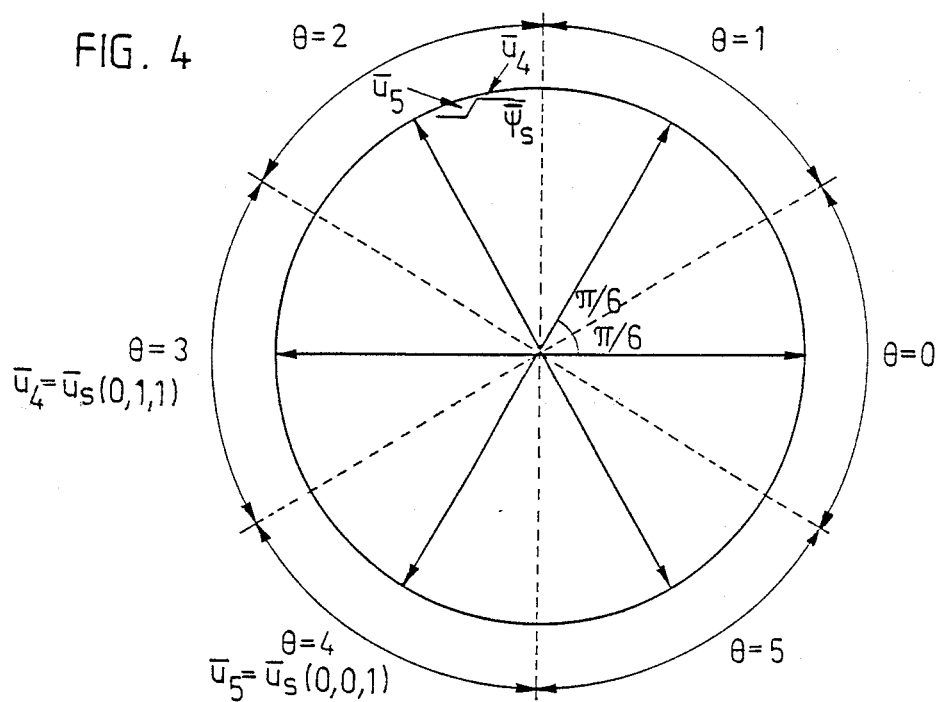

FIG. 4 shows a flux circle divided into six sectors $\theta$ so that the boundaries of the sectors indicated with dotted lines bisect the angles between the voltage phasors. In each sector, two phasors are used, one for each rotating direction; one of said phasors increases and the other reduces the flux. E.g. in Sector 2 ($\theta=2$) the phasor $\overline{u}_s$ (0,1,1) is used when one wishes to increase the flux and the phasor $\overline{u}_s$ (0,0,1) is used when one wishes to reduce the flux.

The absolute value of the flux may be regulated in accordance with the principle of normal two-point control. The flux is increased until it is at the upper hysteresis limit, whereafter the flux is reduced until it is at the lower hysteresis limit. The suitable hysteresis limits are determined on the basis of the allowable switching frequency and losses. The absolute value bit for the flux is indicated herein by $\xi$, which will have the value 1 when one desires to increase the flux and 0 when one desires to reduce the flux.

The voltage phasors used may be tabulated on the basis of the flux phasor sector and the absolute value bit.

| (a) positive rotating direction (counterclockwise) | | | | | | |
|---|---|---|---|---|---|---|
| | $\Theta$ | | | | | |
| $\zeta$ | 0 | 1 | 2 | 3 | 4 | 5 |
| 0 | 3 | 4 | 5 | 6 | 1 | 2 |
| 1 | 2 | 3 | 4 | 5 | 6 | 1 |

Table 2. Voltage phasors used with different values of $\theta$ and $\xi$

| (b) negative rotating direction | | | | | | |
|---|---|---|---|---|---|---|
| | $\Theta$ | | | | | |
| $\zeta$ | 0 | 1 | 2 | 3 | 4 | 5 |
| 0 | 5 | 6 | 1 | 2 | 3 | 4 |
| 1 | 6 | 1 | 2 | 3 | 4 | 5 |

Table 3. Voltage phasors used with different values of $\theta$ and $\xi$

The highest rate of rise of the torque is obtained by advancing the flux as rapidly as possible. Correspondingly, the fastest way to decrease the torque is to reverse the flux as rapidly as possible. Actually to reduce the torque is to increase it in the reverse rotating direction. However, in a steady state it is not reasonable to use the counterphasor to control the torque, since its use requires electrical power and increases the switching frequency. On the other hand, in the steady state one may utilize for torque reduction the zero phasor which will maintain the torque within the desired range of variation for a maximum of time.

One may also apply to the selection of the flux move phasor (forward, backwards, zero phasor) two-point control, but in the form of three-level hysteresis. The allowable range of torque variation $\Delta T$ within which the control will maintain the torque is selected. The selection of $\Delta T$ is chiefly dependent on the desired accuracy of regulation and the allowable switching frequency. The (negative) differential value ($T_{ref}-T$) of the torque is compared with the allowable range of variation. If the torque becomes higher than the reference value, the zero phasor is selected and is used until ($T-T_{ref}$) falls below $\Delta T$. Thereafter the torque-increasing phasor is selected. The reversing phasor is selected when the differential value of the torque increases in the other direction to be higher than $\Delta T$.

The "torque bit" which may have the values 0, 1 and $-1$ is indicated with $\tau$. When $\tau=0=>$ the zero phasor is used $\tau=1=>$ the flux is advanced in the positive rotating direction $\tau=-1=>$ the flux is reversed in the negative rotating direction.

When torque control is combined with two-point flux control, an optimum switching table can be produced. Tables 2 and 3 show the phasors used in each rotating direction. The optimum switching table is obtained from these tables in such a way that when $\tau=1$, the flux is rotated in the positive direction and when $\tau=-1$ the flux is rotated in the negative direction. When $\tau=0$ the zero phasor is selected.

However, the control principle presented has its drawbacks. In principle, the inverter yields a first harmonic r.m.s. voltage of 0.78 $U_{DC}$. This voltage is attained when each voltage phasor in turn is used for 60°. With the control principle presented, this is achieved if the hysteresis of the flux is sufficiently high. This situation has been illustrated in FIG. 5.

However, in that case the torque control is not operable any longer in the torque-increasing direction, that is, the reference value for the torque is not necessarily realized, since the stator flux $\psi_s$ already rotates at its maximum speed. At the same time, this means that in future the rotating speed of $\psi_s$ can only be increased by reducing the reference value for the flux, since thereby one shortens the distance that $\psi_s$ will have to travel during 60°.

There are two reasons for changing the rotating speed of the flux:

1. change of the mechanical rotating speed
2. change of slip frequency

In change situations, to avoid transients an attempt should be made to keep the origin as well in place as possible.

Figures 6A, 6B, 6C:
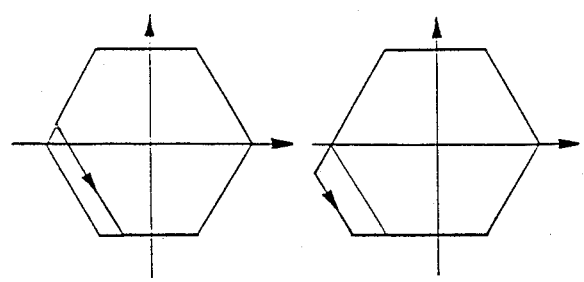

In a domain wherein one must strive at a high output voltage (high velocities), a torque step upwards can be taken by "taking a short cut" for the stator flux to be more in advance of the rotor flux. For a step downwards, there are two alternatives. The stator flux may be rotated at a greater distance from the origin, or the zero phasor may be used. FIG. 6a illustrates a torque step upwards, FIG. 6b a torque step downwards by the deformation method, and FIG. 6c a torque step downwards by the stopping method.

All that has been presented in the foregoing is generally known e.g. from different articles and from European published application No. 0 179 356. However, an effective method for applying the ideas presented has not been previously known.

Therefore, the object of the present invention is to provide a method wherewith the torque is regulated to be as desired, both with maximum voltage and in the vicinity of maximum voltage, with all frequencies. This is achieved with the method according to the invention, being characterized by determining the value representing the difference between the reference value and actual value of the angle between the stator flux and the rotor flux of the motor on the basis of a value representing the requirement for torque change of the motor, e.g. by means of the difference between the reference value and actual value of the torque, and a quantity representing the magnetic state of the motor; shifting the next switching moment of the switches of the inverter, i.e. the so called limit between flux sectors, with a first quantity proportional to the determined differential value to change the angle between the stator flux and rotor flux, i.e. the torque of the motor, in a stepwise manner to be as desired; and shifting that switching moment of the switches of the inverter which is next in turn with a second quantity proportional to the determined differential value and reverse to the first quantity to change the rotating speed of the stator flux. In that connection, when said differential value is determined the quantity representing the magnetic state of the motor can be the actual value of the stator flux or a quantity corresponding thereto or a quantity proportional thereto, such as the reference value of the stator flux, the actual or reference value of the air gap flux, the actual or reference value of the exciting current or other corresponding quantity dependent on the actual value of the stator flux.

The method of the invention is characterized in that the flux is automatically set at each moment at the highest attainable value. It is also typical of the control that the torque control will endeavor to correct the torque to have the correct value during the next 60° sector.

Figure 3:
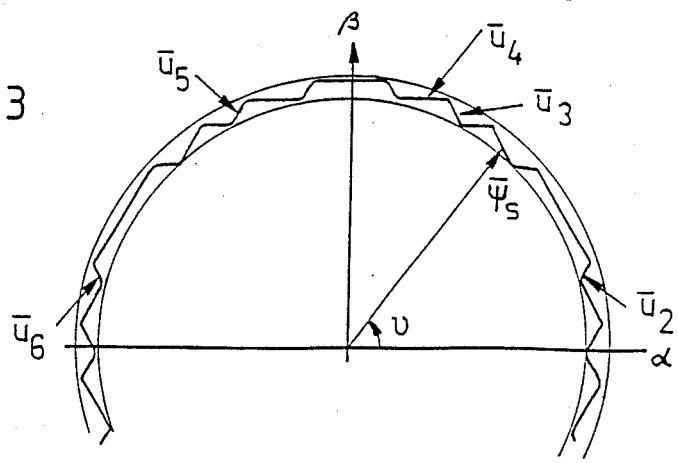
Figure 5:
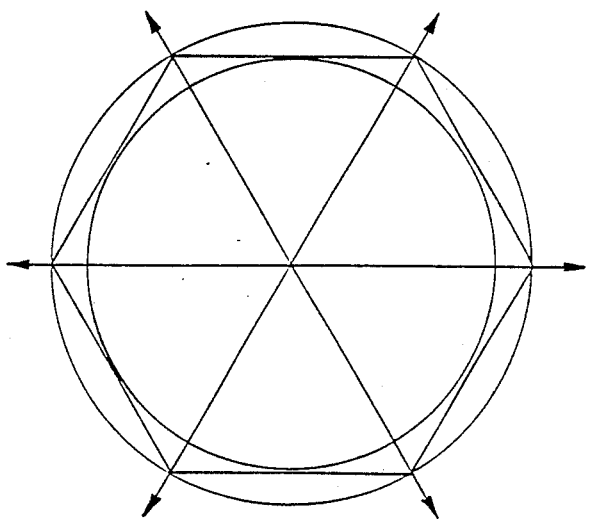
Figure 7:
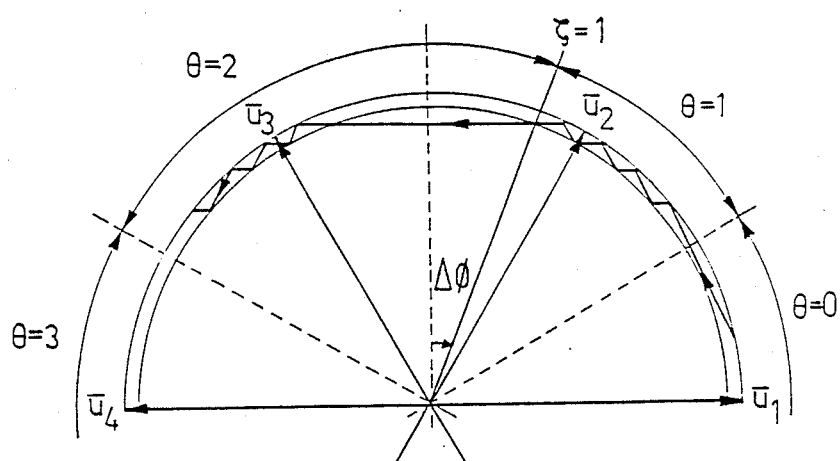
Figure 8:
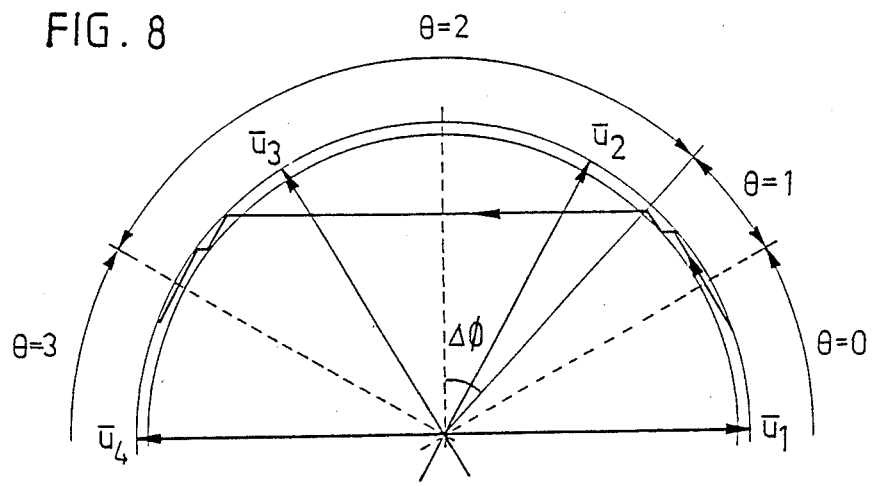
Figure 9:
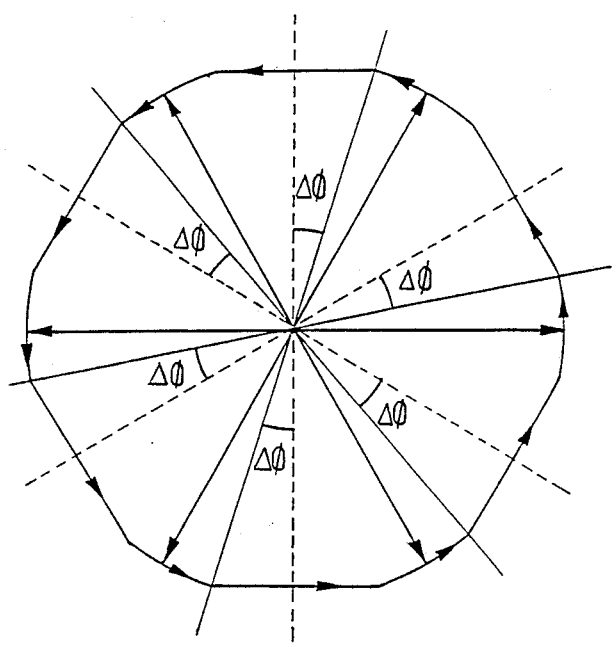
Figure 10:
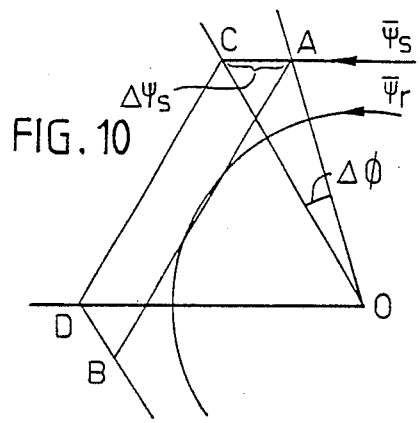
Figure 11:
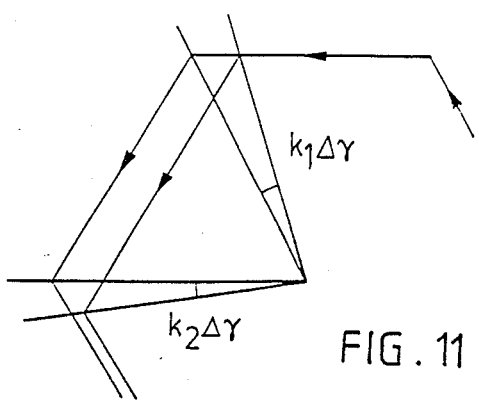
Figure 12:
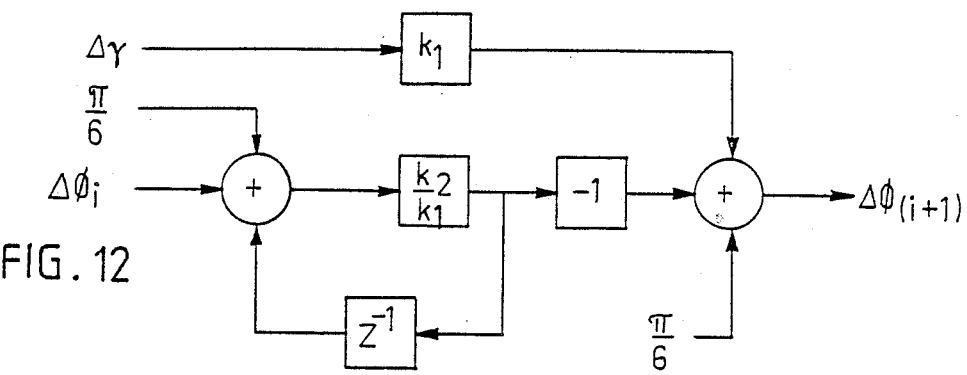
Figure 13:
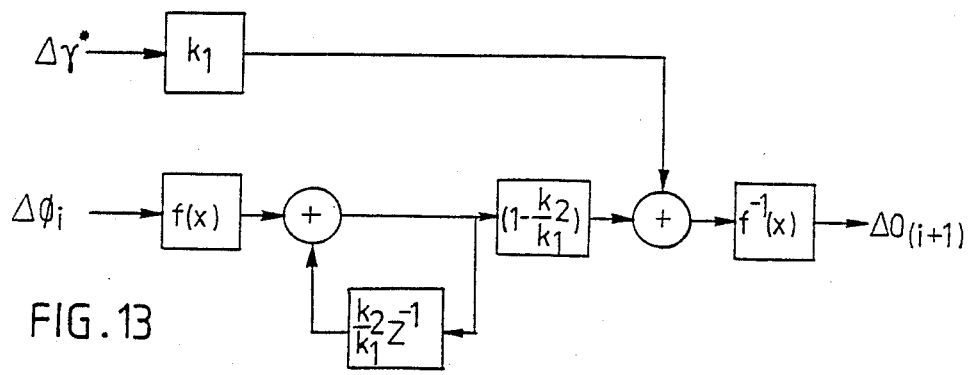

The following is a more detailed description of the method of the invention with reference to the accompanying drawings wherein FIG. 1 shows a principal diagram of the inverter-motor combination, FIG. 2 presents the voltage star for the inverter, FIG. 3 shows an example of the selection of voltage phasors, FIG. 4 shows the flux sectors, FIG. 5 shows the formation of a hexagonal stator flux circle, FIGS. 6a, 6b and 6c show the change in the form of the stator flux circle when a torque step is taken upwards, a torque step is taken downwards by the deformation method and a torque step is taken downwards by the standstill method respectively, FIG. 7 shows the behavior of the stator flux with the change of the sector limit, FIG. 8 shows the behaviour of the stator flux with a considerable change of the sector limit, FIG. 9 shows the stator flux in the steady state on the border of the constant flux and the field weakening domain, FIG. 10 shows flux phase displacement by the deformation method, FIG. 11 shows the combination of torque change and frequency change, FIG. 12 shows the torque control in the field weakening domain of the block diagram, and FIG. 13 shows the torque control n the border of the constant flux and the field weakening domain in the block diagram.

The method of the invention is based on the utilization of the angle $\gamma$ between the stator and rotor flux.

The differential equation for the rotor in the rotor coordinates is $$\frac{d\psi_r^r}{dt} + R_r i_r^r = 0 \quad (2)$$

wherein $\psi_r^r$ is the rotor flux, $R_r$ is the rotor resistance and $$\psi_r^r$$

is the rotor current.

It is apparent from equation (2) that the rotor flux is a mathematically continuing function as long as the rotor current $$i_r^r$$

is not infinite. Since the rotor resistance $R_r$ is low with high-power cage induction motors, (0.01-0.02 pu with motors of over 10 kW), the rotor flux is not only a mathematically continuing function but it behaves moderately in the rotor coordinates. In short-interval observation, the rotor can be regarded as a non-resistance short-circuited winding wherein the flux cannot change.

In order to obtain a mathematical basis for the discussion, the stator flux $\psi_s$ is divided into a component $$\psi_{sd}^r$$

having the direction of the rotor flux $\psi_r$ and a component $$\psi_{sq}^r$$

perpendicular thereto. The corresponding equations are $$\sigma\tau_r \frac{d\psi_r}{dt} + \psi_r = \frac{L_m}{L_s} \psi_{sd}^r \quad (3)$$

$$\sigma\tau_r p \psi_r = \frac{L_m}{L_s} \psi_{sq}^r \quad (4)$$

$$T_m = P_N \frac{1-\sigma}{\sigma L_m} \psi_r \psi_{sq}^r \quad (5)$$

$$= P_N \frac{1-\sigma}{\sigma L_m} \psi_r \chi_s \sin\gamma$$

wherein $\sigma$=dispersion coefficient, $\tau_r$=time constant of rotor, $L_m$=excitation inductance, $L_s$=total inductance of stator, $p$=rotating speed of rotor flux in the rotor coordinates, $T_m$=air gap torque, $P_N$=number of pairs of poles and $\gamma$=angle between stator flux and rotor flux.

It can be seen from these equations that it is possible to control the torque using the angle between the stator flux and the rotor flux similarly as in a synchronous machine. The rotor flux is approximately constant in the rotor coordinates within a short interval, and thus it is possible to produce a rapid torque change by means of a rapid change of the angle $\gamma$ between the stator flux and rotor flux. This angle change is produced by phase shifting the stator flux for the correct amount $\Delta\gamma$.

Within a long interval, the situation is different from that in a synchronous machine, since the slip frequency is dependent on the instantaneous values of the fluxes according to equation (4). Therefore, in torque step changes the phase shift $\Delta\gamma$ must always be followed by an amplitude change of the° flux as well, wherewith the variations in slip frequency are compensated.

The invented method functions as follows: The required change in the angle between the stator flux and rotor flux is first calculated on the basis of the actual value and reference value information for the torque and the actual value information for the flux. The angle change is indicated with $\Delta\gamma$. This angle change is produced by shifting the limit of the flux sector for the angle $\Delta\phi$. $\Delta\phi$ can be calculated on the basis of $\Delta\gamma$ and past information.

As was stated earlier, the two-point control of the flux will give as the output $\xi=0$ when the flux has to be reduced $\xi=1$ when the flux has to be increased.

The flux bit $\xi=1$ which is utilized to bring about the phase shift is set on the boundary of the sectors. If, for instance, the limit between sectors 1 and 2 as shown in FIGS. 4 and 7 is changed for the extent of the angle $\Delta\phi$, the result will be the following:

in sector $\theta=2$ the phasor $\bar{u}_4(0,1,1)$ is used when a flux increase is desired, i.e. $\xi=1$. Correspondingly, the phasor $\bar{u}_5(0,0,1)$ is used when a flux reduction is desired, i.e. $\xi=0$, on the boundary of the sectors, $\xi$ is set to be 1, as a result of which the phasor $\bar{u}_4(0,1,1)$ is used as long as the flux bit turns into zero (i.e. the flux reaches the hysteresis limit) or a new sector is traversed.

The change of the sector limit will result in a correction according to FIG. 7. It has been indicated with a dotted line in what way the flux would behave if the sector were in a standstill.

Thus the control system performs "incorrectly" in the domain $\Delta\phi$ which the sector $\theta=2$ has invaded from the sector $\theta=1$. Even though the flux bit $\xi=1$, a flux-reducing phasor is used. Only when the flux goes beyond the limit of the theoretical sector, the control will behave in accordance with normal two-point control.

FIG. 7 shows a "slight correction" when $\Delta\phi<\pi/6$. The principle is also operable with "large corrections" when $\Delta\phi>\pi/6$, as has been shown in FIG. 8. If in the case of FIG. 8 the boundary between sector 2 and sector 3 would have been inverted for about $\pi/6=30°$ C., the result would have been a hexagon.

The theoretical upper limit for $\Delta\phi$ is $\pi/3$. With values greater than this, the sectors overlap and the result is no longer unequivocal. On the other hand, if $\Delta\phi=\pi/3$, this means—when one starts from the steady state—a change of 0.47 rad=27° in the angle between the stator flux and rotor flux, which is a considerable change.

The lower limit for $\Delta\phi$ is naturally 0. If $\Delta\phi$ were negative, this would mean that no flux-reducing phasor would be available, but both phasors used would increase the flux. Such a situation is not reasonable with high velocities.

Thus, $\Delta\phi$ may have values in the range $0 \ldots \pi/3 \cong 1$.

If a correction of the same magnitude is made in each sector, the flux circle will have a configuration as shown in FIG. 9. When $\Delta\phi$ increases above 30 degrees, the result is a hexagon. The amplitude of the flux may then be adjusted to be as desired by further reversing the boundaries. Correspondingly, when $\Delta\phi$ approaches the value 0, the torque can no longer be reduced by reversing the boundaries, but then two-point controls can be applied. Thus the torque control with full voltage and the transition from the domain of the constant flux to the domain of field weakening and vice versa may be flexibly realized with changes in the boundaries of the sectors.

The following quantities are needed to carry out the control:

instantaneous value $\psi_s$ of stator flux
approximate values of motor parameters
$L_s$ = excitation inductance + stray inductance = total inductance of stator
$\sigma$ = dispersion coefficient
actual value of torque as instantaneous value information (e.g. $T = \psi_s x i_s$)
information on reference value $T^*$ of torque.

The actual value of the angle $\gamma$ between the stator flux and rotor flux can be calculated from the instantaneous values of the stator flux and torque and from th motor parameters as follows:

$$\gamma = \frac{1}{2} \arcsin \frac{\sigma L_s}{1-\sigma} \frac{2T}{\psi_s \psi_{s,SUOD}} \quad (6)$$

wherein $\psi_{s,SUOD}$ = filtered instantaneous value of stator flux.

Correspondingly, the reference value of $\gamma$ is $$\gamma^* = \frac{1}{2} \arcsin \frac{\sigma L_s}{1-\sigma} \frac{2T^*}{\psi_s \psi_{s,SUOD}} \quad (7)$$

From these values one can calculate the differential value of the angle $$\Delta\gamma = \gamma^* - \gamma \quad (8)$$

An approximation for this is also obtained e.g. from the following equation:

$$\Delta\gamma = \frac{\sigma L_s}{1-\sigma} \frac{\Delta T}{\psi_s \psi_{s,SUOD}} \quad (9)$$

In equations (6), (7) and (9), $\psi_{s,SUOD}$ is the filtered instantaneous value of the stator flux which simulates the rotor flux. The rotor flux is relatively stable. If the rotor flux were approximated directly on the basis of the instantaneous value of the stator flux, the ripple component of the absolute value of the stator flux would show as too pronounced particularly when the stator flux is a hexagon. A suitable filtering time constant $\tau_F$ is for instance $$\tau_F = 2 \frac{1}{f_s} \quad (10)$$

wherein $f_s$ is the supply frequency.

In practice, the difference $\Delta\gamma$ between the reference value and actual value of the angle $\gamma$ between the stator flux and rotor flux can be approximated with sufficient precision in view of the resent invention in very many ways. Firstly, the term $$\frac{\sigma L_s}{1-\sigma}$$

is in principle a motor-related constant which, can obviously be approximated with sufficient precision at least according to the motor type or even more universally. Yet it is evident that even relatively inaccurate estimation of said term has no adverse effect on the practical realization of the method of the invention. As for the terms $\psi_s$ and $\psi_{s,SUOD}$, $\psi_s$ represents the instantaneous magnetic state of the motor and can be determined either directly or by means of a quantity representing the magnetic state of a number of other motors as well, such as the air gap flux and the exciting current or eve the time of full cycle. In practical implementations, also the reference values of the stator flux, air gap flux or exciting current form a suitable basis for the approximation of the actual value of the stator flux. Thus the most essential term, requiring the most exact information, in equation 9 is $\Delta T$, that is, the desired change of torque.

The next consideration is what kind of change deformation of the hexagon will produce in the angle $\gamma$ between the fluxes. The situation is as shown in FIG. 10. In the normal state, the stator flux travels the path ACDB. The rotor flux advances along the periphery of a circle. If instead of the path ACDB the path AB is travelled without entering points C and D, the stator flux will travel the path $\Delta\psi_s$ shorter than normal. This will produce a phase shift of the fluxes $$\Delta\gamma \approx \Delta\phi' \quad (11)$$

if the rotor flux and frequency remain constant. In virtual motors, however, this is not the case, but the torque step and deformation of the hexagon produce a change in the rotor flux and slip frequency. In practice this means that at the beginning of the torque step $\Delta\phi'$ shall be greater than $\Delta\gamma$. This can be taken into account by means of a motor-related coefficient $k_1$, that is, $$\Delta\phi' = k_1 \Delta\gamma \quad (12)$$

Correspondingly, since the slip frequency (and possibly the mechanical rotating speed) will also change as a result of the torque step, in the next sector the angle change in the negative direction, $k_2\Delta\gamma$ shall be less than $k_1\Delta\gamma$. Such a combined torque and frequency change has been illustrated in FIG. 11.

This yields as the control algorithm $$\Delta\phi = k_1 \Delta\gamma - k_2 \Delta\gamma_{(-1)} + \pi/6 \quad (13)$$

when $\Delta\phi$ is calculated from the normal flux sector limit and $\Delta\gamma_{(-1)}$ represents the temporally preceding value of $\Delta\gamma$.

Coefficient $k_1$ thus compensates for the change in the rotor frequency in torque change within a short interval so that the torque is changed to be as desired.

The difference $(k_1-k_2)$ is used to determine how great a change in the flux rotating speed is to be made in connection with the torque change. In FIG. 11 this change is visible as the reduction of the radius of the flux circle.

In accordance with this principle, no rotating speed value is needed for the torque control when one operates with the maximum output voltage of the inverter, in which case the motor is in the field weakening domain according to optimum rating. The basic notion is that each rotating speed-torque combination has in the steady state a precisely defined flux circle radius and frequency when one operates with a constant voltage. If the supply frequency deviates from this value, this is sooner or later reflected in the actual value of the torque. If the torque control also changes the rotating speed of the flux in a certain proportion to the torque change, the rotating speeds can be taken into account in the torque control only.

In practice, one will thus anticipate whether the change in the differential value of the torque is due to a change in the torque reference value or a change in the rotating speed, and each of these is then changed in a certain proportion to one another. After 60 degrees a check is made as to how the control succeeded, and the necessary corrections are effected—again in the torque as well as frequency. After some time, each of these will be as desired.

Writing out equation (13) retrospectively, we have $$\Delta\phi = \frac{\pi}{6} + k_1\Delta\gamma - \frac{k_2}{k_1}\left(\Delta\phi_{(-1)} - \frac{\pi}{6} - \left(\frac{k_2}{k_1}\right)^2\right) \tag{14}$$

$$\left(\Delta\gamma_{(-2)} - \frac{\pi}{6}\right) - \left(\frac{k_2}{k_1}\right)^3 \left(\Delta\phi_{(-2)} - \frac{\pi}{6}\right) - \ldots$$

i.e.

$$\begin{cases} \Delta\phi = k_1\Delta\gamma - \frac{k_2}{k_1}\Delta100_{SUOD} + \frac{\pi}{6} \\ \Delta\phi_{SUOD} = \Delta\phi_{(-1)} + \frac{k_2}{k_1}\Delta\phi 22220491836701707_{SUOD(-1)} - \frac{\pi}{6} \end{cases} \tag{15}$$

An example of a control block diagram formulated on the basis of these equations is presented in FIG. 12 wherein $Z^{-1}$ represents storing the input value and supplying the previous value to the output. Thus the block diagram according to FIG. 12 is applicable when the maximum inverter output voltage is used.

On the border of the constant flux and field weakening domain wherein the flux circle is not yet a hexagon the control algorithm is more complex, since the phase-shifting effect of the rotating angle of the flux sector limit on the stator flux is non-linear. If the rotating angle of the limit has been $\Delta\phi_{(-1)}$ in the previous sector and is $\Delta\phi$ in the present sector, a change in the angle between the fluxes is produced when this steady state is departed from:

$$\Delta\gamma = f(\Delta\phi) - f(\Delta\phi_{(-1)}) \tag{16}$$

wherein f can be approximated e.g. as follows:

$$\begin{cases} f(x) = 2\left[\ln\tan\left(\frac{\pi}{4} + \frac{x}{2}\right) - \sin x\right] \text{ when } x \leq \frac{\pi}{6} \\ f(x) = 4\ln\sqrt{3} - 2\ln\tan\left(\frac{\pi}{4} + \frac{\frac{\pi}{3} - x}{2}\right) - 2\sin x \text{ when } x > \frac{\pi}{6} \end{cases} \tag{17}$$

The necessary $\Delta\phi$ from equation (16) can be solved $$\Delta\phi = f^{-1}[\Delta\gamma + f(\Delta\phi_{(-1)})] \tag{18}$$

wherein $f^{-1}$ is the inverse function of f.

By means of this algorithm, the first $\Delta\phi$ in the torque step starting from the steady state can be correctly calculated. The change of the next sector is not obtained correctly, since the starting situation is no longer the steady state. In other words, if the torque has changed to be as desired in the course of 60°, $\Delta\gamma$ is 0, and according to equation (18) the $\Delta\phi$ of the next sector is equal to that of the preceding one. This will result in a new change of the angle between the fluxes, said change being of the same magnitude, and the torque will increase too high or be reduced too low depending on the direction of the torque change desired.

This problem can be eliminated by substituting for $\Delta\phi$ $$\Delta\gamma = k_1\Delta\gamma^* - k_2\Delta\gamma^*_{(-1)} \tag{19}$$

wherein $\Delta\gamma^*$ = desired change of angle between fluxes $k_1$ and $k_2$ = control parameters corresponding to those of the field weakening domain.

Substituting equation (19) for $\Delta\gamma$ in equation (18), we have $$\Delta\phi = f^{-1}[k_1\Delta\gamma^* - k_2\Delta\gamma^*_{(-1)} + f(\Delta\phi_{(-1)})] \tag{20}$$

In the algorithm according to equation (20), the rotating angle $\Delta\phi$ of the sector limit is influenced by two factors: by means of the term $k_1\Delta\gamma^*$ the necessary need for change is taken into account, and from the past information $$f(\Delta\phi_{(-1)}) - k_2\Delta\gamma^*_{(-1)} \tag{21}$$

the rotating angle of the limit in the steady state is found. If no change has been made in the preceding sector, $\Delta\gamma^*_{(-1)}$ is 0 and $\Delta\gamma_{(-1)}$ directly represents the value in the steady state. If, on the other hand, a change of a certain magnitude has been made in the preceding sector, it must be subtracted from the value $\Delta\phi_{(-1)}$ to find the steady state.

Equation (20) can be written out retrospectively, which gives $$\Delta\phi = f^{-1}\Bigg\{ k_1 \Delta\gamma^* + \left(1 - \frac{k_2}{k_1}\right) \quad (22)$$

$$\left[ f(\Delta\phi_{(-1)}) + \frac{k_2}{k_1} f(\Delta\phi_{(-2)}) + \right.$$

$$\left. \left(\frac{k_2}{k_1}\right)^2 f(\Delta\phi_{(-3)}) + \left(\frac{k_2}{k_1}\right)^3 f(\Delta\phi_{(-4)}) + \ldots \right]$$

An example of a block diagram of torque control to be applied on the boundary of the constant flux and the field weakening domain, formulated on the basis of equation (22), is presented in FIG. 13.

In the foregoing, the method of the invention has been illustrated by means of an example relating to a three-phase current system, but as was already stated at the beginning, the invention can also be implemented to cases wherein the number of phases is other than three.

What is claimed is:

1. A method for controlling an ac motor supplied by an inverter having several switches, comprising the steps of:
   determining a value ($\Delta\gamma$) representing the difference between a reference value and actual value of the angle between the stator flux and rotor flux of the motor on the basis of a value representing the requirement for torque change of the motor, e.g. by means of the difference ($\Delta T$) between a reference value ($T^*$) and an actual value ($T$) of the torque, and a quantity representing the magnetic state of the motor, such as the actual value of the stator flux ($\chi s$) or a quantity corresponding thereto or proportional thereto, such as the reference value of the stator flux, the actual difference value of the air gap flux, the actual or reference value of the exciting current or other corresponding quantity dependent on the actual value of the stator flux ($\chi s$);
   determining a first quantity ($k_1 \Delta\gamma$) directly proportional to the determined differential value;
   shifting a stitching moment of the switches of the inverter in a first sense with said first quantity to change the angle ($\gamma$) between the stator flux an rotor flux in a stepwise manner;
   determining a second quantity ($k_2 \Delta\gamma$) directly proportional to the determined differential value; an
   shifting that stitching moment of the switches of the inverter which is next in turn with said second quantity ($k_2 \Delta\gamma$) in a second sense opposite with respect to the first sense to change the rotating speed of the stator flux.

2. A method as claimed in claim 1, wherein the step of determining the difference ($\Delta\gamma$) of the reference value and actual value of the angle between the stator flux and rotor flux is carried out by means of the change requirement ($\Delta T$) of the motor torque, the actual value of the stator flux ($\chi s$), the filtered instantaneous value for the stator flux, the total inductance ($L_S$) of the stator and the dispersion coefficient ($\sigma$), from the equation:

$$\Delta\gamma = \frac{\sigma L_s}{1 - \sigma} \cdot \frac{\Delta T}{\psi_s \psi_{SUOD}}$$

3. A method as claimed in claim 1, wherein when operating with the maximum inverter output voltage, the step of determining the first quantity comprises multiplying the differential value ($\Delta\gamma$) by a first motor-related constant ($k_1$).

4. A method as claimed in claim 1, wherein when operating with the maximum inverter output voltage, the step of determining the second quantity comprises multiplying the differential value ($\Delta\gamma$) by a second motor related constant ($k_2$).

5. A method as claimed in claim 3, wherein when operating with the maximum inverter output voltage, the step of determining the second quantity comprises to the determined differential value is determined by multiplying the differential value ($\Delta\gamma$) by a second motor-related constant ($k_2$).

6. A method as claimed in claim 1, wherein the step of determining a value ($\Delta\gamma$) representing the difference between a reference value an actual value of the angle between the stator flux and rotor flux of the motor uses the difference ($\Delta T$) between a reference value ($T^*$) and an actual value ($T$) of the torque, an a quantity representing the magnetic state of the motor.

7. A method as claimed in claim 6, wherein the step of determining a value ($\Delta\gamma$) representing the difference between a reference value and actual value of the angle between the stator flux and rotor flux of the motor uses th actual value of the stator flux ($\chi s$) or a quantity corresponding thereto or proportional thereto, such as the reference value of the stator flux, the actual or reference value of the air gap flux, the actual or reference value of the exciting current or other corresponding quantity dependent on the actual value of the stator flux ($\chi s$).

* * * * *